United States Patent [19]
Hall et al.

[11] Patent Number: 5,605,074
[45] Date of Patent: Feb. 25, 1997

[54] SECURITY COLLAR FOR ADJUSTABLE CORE ELEMENT TERMINAL

[75] Inventors: Michael Hall, Ortonville; John W. Harrison, Lapeer; Dan Chegash, Roseville; Michael Reasoner, Ortonville; Orest Iwasiuk, Farmington Hills, all of Mich.

[73] Assignee: Teleflex Incorporated, Plymouth Meeting, Pa.

[21] Appl. No.: 523,187

[22] Filed: Sep. 5, 1995

[51] Int. Cl.$^6$ .................................................. F16C 1/14
[52] U.S. Cl. ........................................ 74/502.6; 74/502.4
[58] Field of Search ............................. 74/502.4, 502.6, 74/501.5 R; 403/315, 316; 24/585, 654

[56] References Cited

U.S. PATENT DOCUMENTS

| | | |
|---|---|---|
| 4,887,930 | 12/1989 | Chaczyk et al. . |
| 5,163,338 | 11/1992 | Sharp et al. . |
| 5,394,770 | 3/1995 | Boike et al. . |

*Primary Examiner*—Charles A. Marmor
*Assistant Examiner*—Mary Ann Battista
*Attorney, Agent, or Firm*—Howard & Howard

[57] ABSTRACT

A motion-transmitting remote-control assembly (10) of the type for transmitting motion along a curved path by a flexible motion-transmitting core element (12) with a conduit (14) slidably supporting the core element (12). A terminal (30) has a bore (32) extending therethrough and defines oppositely facing first (32a) and second (32b) openings with the second opening (32b) disposed for connecting the core element (12) to a control member (24). An adjustment interconnects the terminal (30) and the core element (12) for adjusting the position of the terminal (30) axially along the core element (12) and includes a lock button (36) movable between an unlocked position extending from the assembly and a locked position within the assembly for locking the axial position of the terminal (30) relative to the core element (12). The assembly is characterized by a collar (58) locked in a shipping position by the extended lock button (36) for preventing the insertion of a control member (28) into the first opening (32a) and movable to an installed position for maintaining the lock button (36) in the locked position. Therefore, the collar (58) prevents an installer from inadvertently inserting a control member (28) into the first opening (32a) during installation and thereafter insures that the lock button (36) is fully in the locked position when moved to the installed position. The collar (58) is slidably movable along the terminal (30) for blocking entry into the first opening (32a) in the shipping position and for covering the lock button (36) in the fully installed position.

9 Claims, 4 Drawing Sheets

SECURITY COLLAR FOR ADJUSTABLE CORE ELEMENT TERMINAL

TECHNICAL FIELD

This invention relates to a motion-transmitting remote control assembly of the type for transmitting motion along a curved path by a flexible motion-transmitting core element. More specifically, the invention relates to an improved adjustable core element terminal by which the length of the core element is adjusted during installation.

BACKGROUND ART

Length adjuster assemblies are commonly integrated into control cable assemblies used in motion-transmitting push-pull applications. Such assemblies are widely used in automobiles, such as with transmission shift controls. These assemblies compensate for variation in distances between mounting points by adjusting the length of the conduit or of the core element. The subject invention relates to the adjustment of the core element.

Typical of these assemblies is one wherein a terminal member slides axially on a core element slider with a lock button to prevent such sliding movement after installation. The terminal member has a bore therethrough for defining a ball socket to receive a small ball extending from the member to be controlled. An example of such an assembly is shown in U.S. Pat. No. 5,163,338 to Sharp et al, U.S. Pat. No. 4,887,930 to Chaczyk et al, and U.S. Pat. No. 5,394,770 to Boike.

Although these assemblies perform very satisfactorily, some installers fail to insert the ball connector into the proper socket and/or fail to totally engage the lock button.

SUMMARY OF THE INVENTION

A motion-transmitting remote-control assembly of the type for transmitting motion along a curved path by a flexible motion-transmitting core element and comprising a flexible motion-transmitting core element slidably supported in a conduit. A terminal means has a bore extending therethrough and defines oppositely facing first and second openings with the first opening disposed for connecting the core element to a control member. An adjustment means interconnects the terminal means and the core element for adjusting the position of the terminal means axially along the core element and including a lock button movable between an unlocked position extending from the assembly and a locked position within the assembly for locking the axial position of the terminal means relative to the core element. The assembly is characterized by security means locked in a shipping position by the extended lock button for preventing the insertion of a control member into the second opening and movable to an installed position for maintaining the lock button in locked position to prevent an installer from inadvertently inserting a control member into the wrong second opening during installation and to thereafter insure that the lock button is fully in the locked position when moved to the installed position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 7:
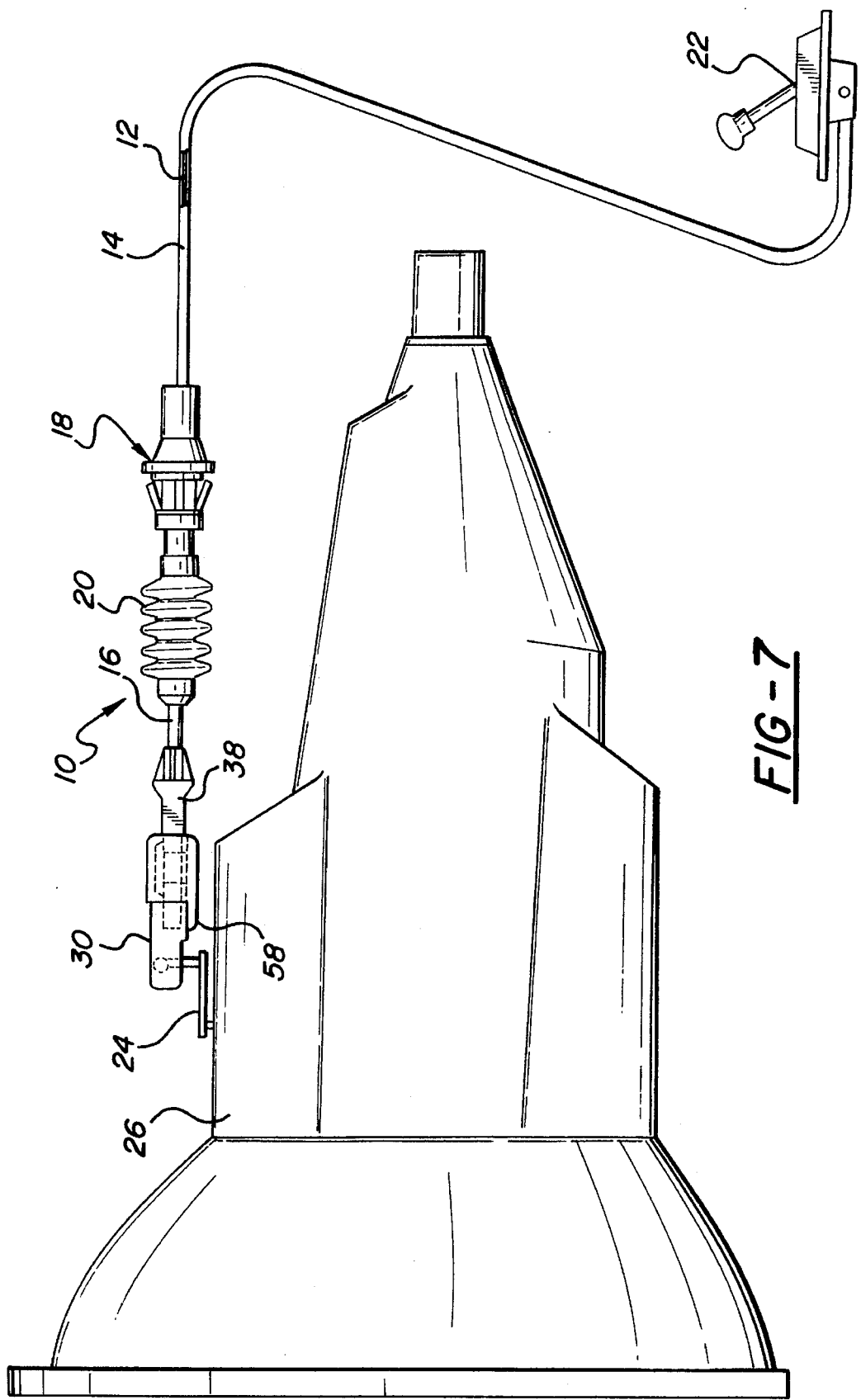
FIG. 7 is an environmental view showing the subject invention associated with an automotive transmission.

A motion-transmitting remote-control assembly of the type for transmitting motion along a curved path is generally shown at 10 and includes a flexible motion-transmitting core element 12 and a conduit 14 slidably supporting the core element 12. The core element 12 is typically a wire-like member attached to a rod 16, which, in turn, is slidably supported and extends from a support fitting 18 of the well known type for disposition in a bulkhead (not shown). A flexible bellows expands and contracts with the push-pull movement of the rod 16 into and out of the support fitting 18. By way of example, the assembly is shown in FIG. 7 interconnecting a shift lever 22 and a control member 24 on a transmission 26 of an automobile. The control member is generally controlled by movement of the core element 12, but may in some environments be the input member instead. The control member 24 includes a ball or sphere 28, the purpose for which is well known in the art and will become clear hereinafter.

The assembly 10 includes a terminal means, generally indicated at 30, and having a bore 32 extending therethrough defining oppositely facing first 32a and second 32b openings with the second 32b opening disposed for receiving and connecting the core element 12 to the ball 28 of the control member 24. A resilient socket member 34 is retained in the bore 32 by reliefs at each end of the bore and includes a circular rib which flexes to receive and retain the ball 28 in the bore 32.

Figure 1:
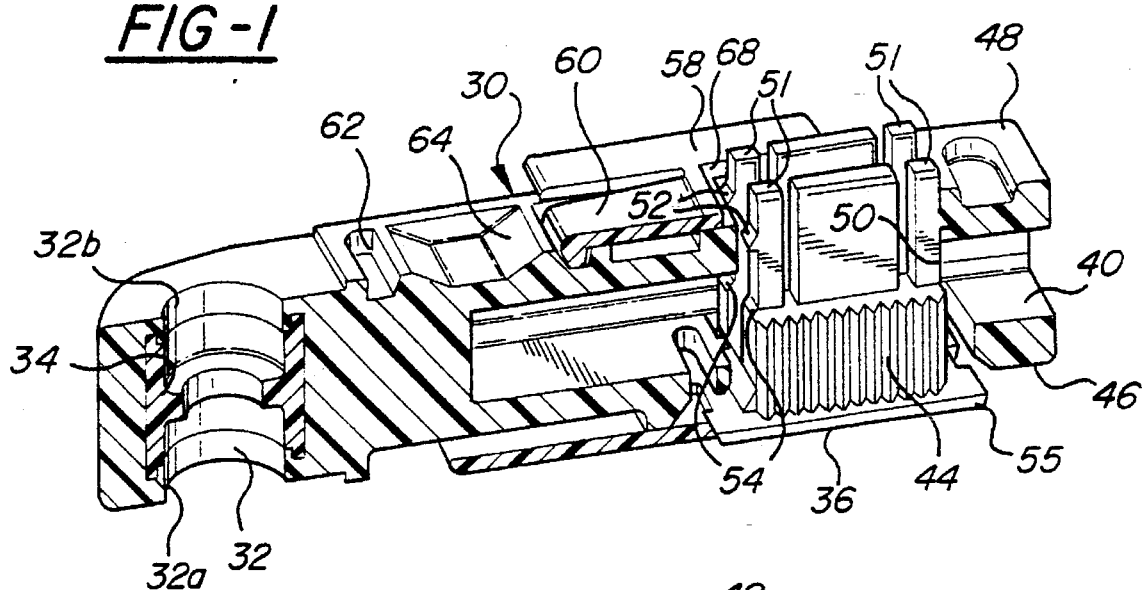
FIG. 1 is a cut-away, perspective view of the core element terminal employing the subject invention.
Figure 2:
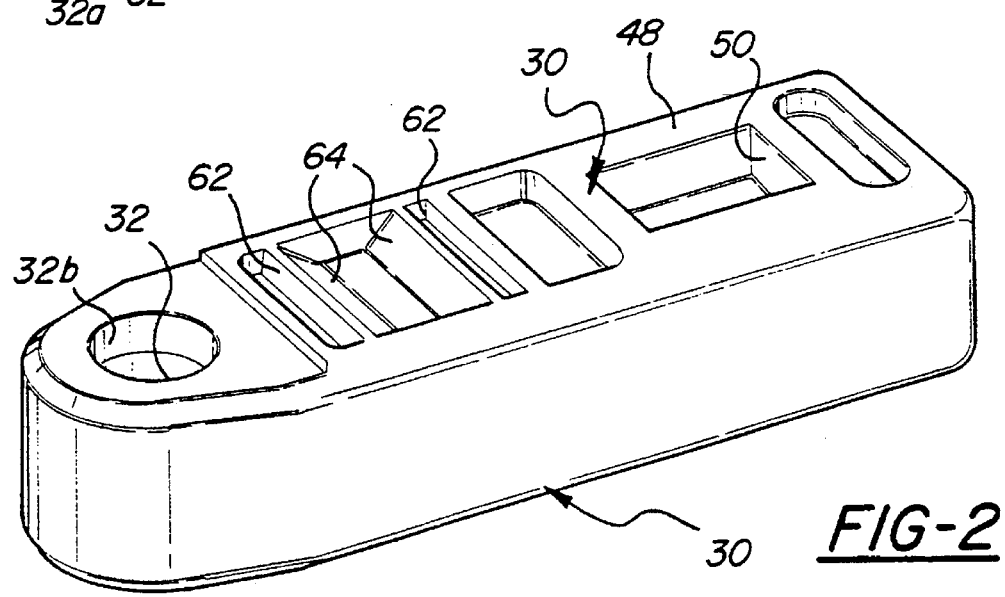
FIG. 2 is a full perspective view similar to FIG. 1.
Figure 3:
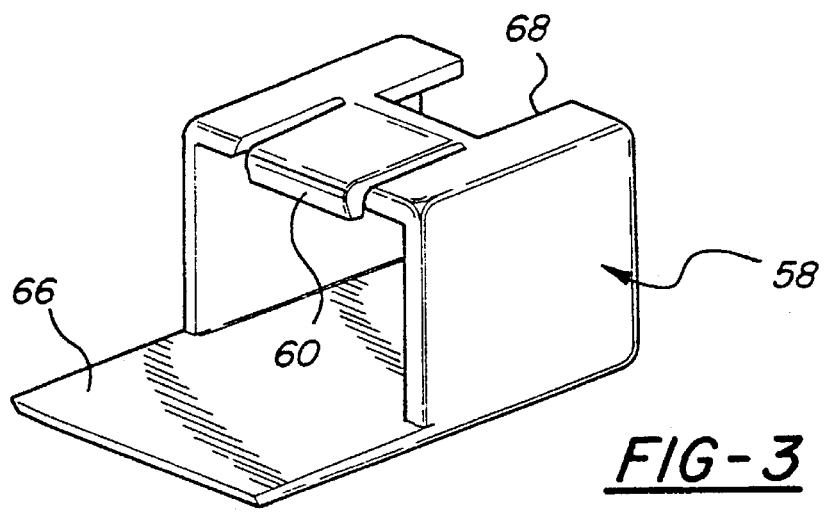
FIG. 3 is a perspective view of the collar component of the subject invention.
Figure 4:
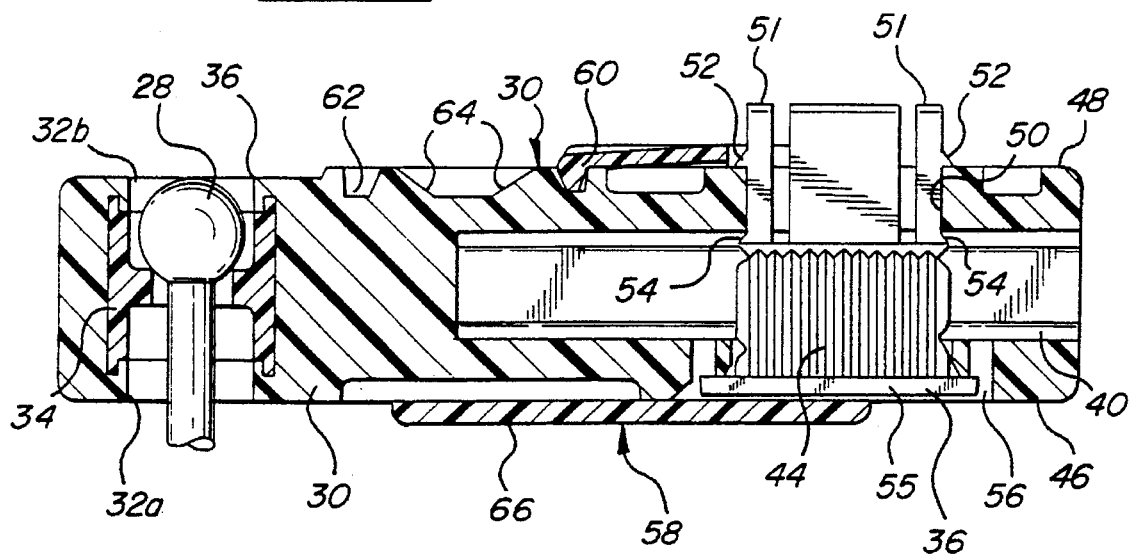
FIG. 4 is a longitudinal cross-sectional view showing the collar in the installed position.
Figure 5:
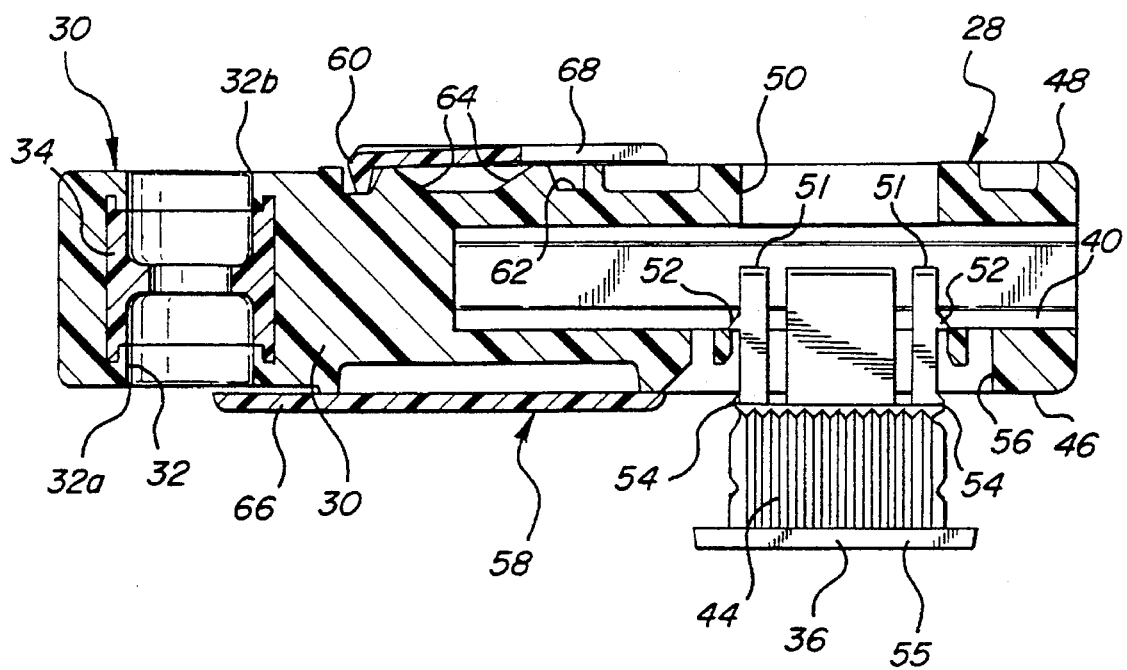
FIG. 5 is a longitudinal cross-sectional view like FIG. 4 but showing the collar in the shipping position.
Figure 6:
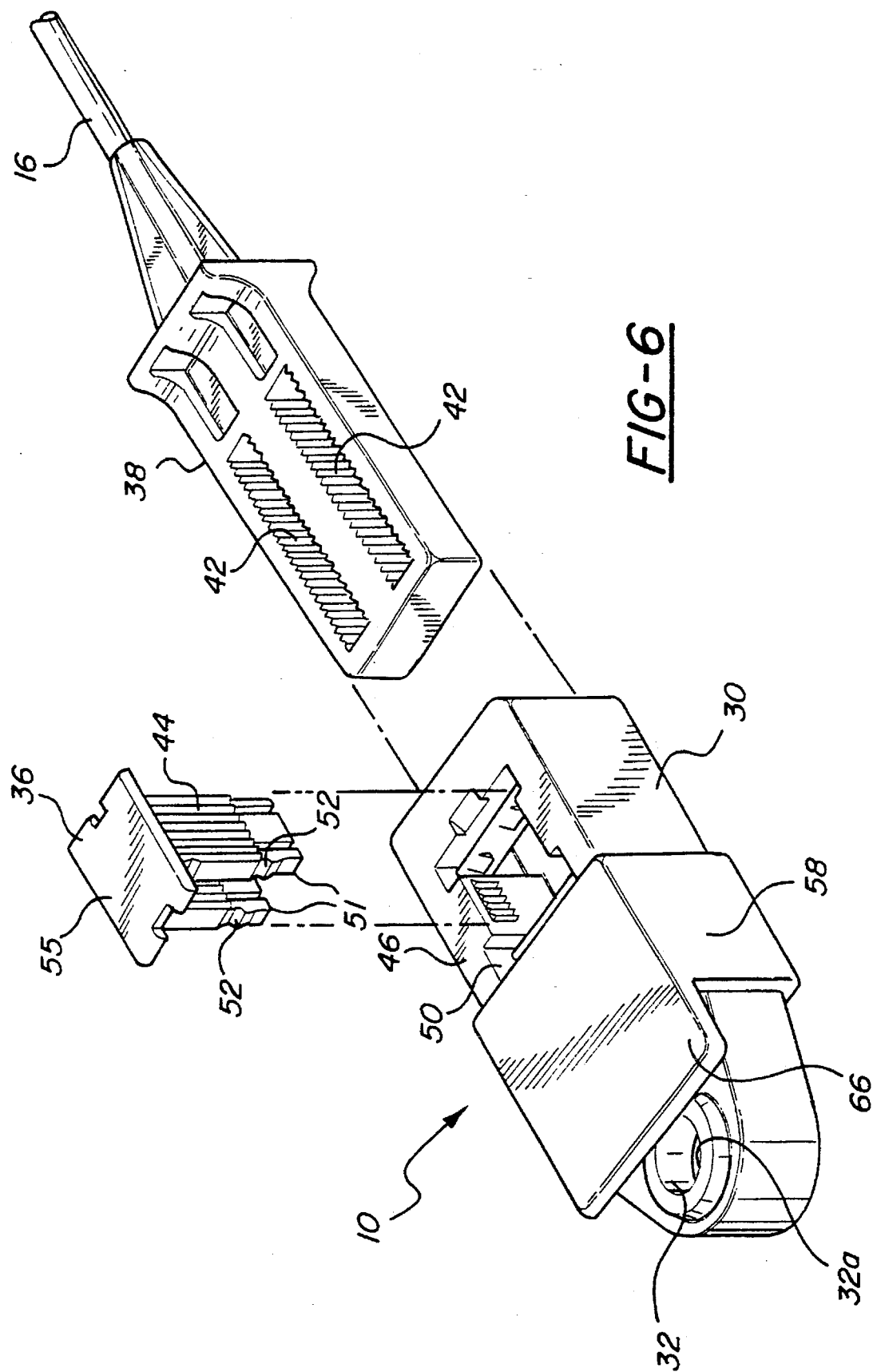
FIG. 6 is an exploded perspective view of the subject invention.

An adjustment means interconnects the terminal means 30 and the core element 12 for adjusting the position of the terminal means axially along the core element 12 and includes a lock button 36 movable between an unlocked position extending from said assembly, as shown in FIG. 5, and a locked position within said assembly for locking the axial position of the terminal means 30 relative to the core element 12, as shown in FIGS. 1, 4 and 7. The adjustment means also includes the shaft member 38 which is disposed for axial sliding movement within a cavity 40 extending axially into the end of the terminal means 30. The shaft member 38 and the lock button 36 include co-acting teeth 42 and 44 respectively for preventing relative movement between the shaft member 38 and the terminal means 30 when the lock button is in the installed position.

The terminal means 30 has first 46 and second 48 opposite sides with a tunnel 50 extending between the sides 46 and 48. The lock button 36 is disposed in the tunnel 50 for movement therein between the extended shipping position shown in FIG. 5 and the installed position shown in FIG. 4. As best shown in FIGS. 1 and 4, the lock button 36 protrudes from the second side 48 of the terminal means when in the installed position. Further, the lock button 36 includes two spaced panels with slots extending thereinto to define cantilevered beams 51. The beams 51 are flexible and include spaced ramps 52 and 54 to saddle the wall of the terminal means 30 between the tunnel 50 and the outside of the second side 48 to firmly hold the lock button 36 in the installed position. The co-acting teeth 44 are disposed on both sides of each of the panels to co-act with two sets of teeth 42 disposed along two slots in the shaft member 38. The lock button 36 also includes a cap 55 which is recess in a recessed 56 in the first side 46 of the terminal means 30.

The assembly is characterized by security means, comprising a collar 58, which is locked in a shipping position by said extended lock button 36 for preventing the insertion of ball 28 of the control member 24 into the first opening 32a. The collar is movable to an installed position for maintaining said lock button 36 in the locked position. Therefore, the collar 58 prevents an installer from inadvertently inserting a ball 28 of a control member 24 into the wrong first opening 32a during installation and thereafter insures that the lock button 36 is fully in the locked position when moved to the installed position. The security member or collar 58 comprises an integral member slidably movable along the terminal means 30 for blocking entry into the first opening 32a in the shipping position and for covering the cap 55 of the lock button 36 in the fully installed position. The collar 58 extends annularly around the terminal means 30 in belt-like fashion. The collar 58 is four-sided to compliment the four sides of the terminal means 30.

There is also included a detent means for releasible retaining the collar 58 in the respective shipping and installed positions. The detent means comprises a cantilevered pawl 60 extending from the collar 58 and a pair of spaced recesses 62 in the second side 48 of the terminal means 30 for receiving the pawl. Slopping ramps 64 are disposed between the recesses 62 to facilitate flexing of the pawl 60 as it moves into the recesses 62, the pawl being biased into the recesses in its free state.

The collar covers 58 the cap 55 of the lock button 36 on the first side 46 of the terminal means 30 when in the installed position and the lock button 36 protrudes from the terminal means 30 on the second side 48 of the terminal means 30 when in the installed position. The collar 58 includes an axially extending flange 66 for blocking the first opening 32a, and a cutout 68 for accommodating the extending portion of the lock button 36 when in the installed position. The cutout 68 and the pawl 60 are disposed on the second side 48 of the terminal means 30.

During shipment, the collar 58 is in the shipping position shown in FIG. 5 with the flange 66 blocking entry into the first opening 32a by the ball 28 of the control member 24. The collar is maintained in the shipping position by the extending lock button 36, which has a second set of detents to hold it in the extended shipping position. The assembly stays in the shipping position until the installer inserts the ball 28 into the proper opening 32b in the terminal means 30, during which installation the control assembly seeks its adjusted length as the shaft member 38 moves along the cavity 40 in the terminal means 30. Once the conduit 14 and/or the core element 12 have been adjusted to the desired lengths, the installer moves the lock button 36 to the locked position shown in FIGS. 1 and 4 with its cap 55 disposed in the recess 56 in the terminal means 30. The installer then slides the collar 58 to the installed position shown in FIG. 4 wherein the collar 58 covers the lock button 36 for maintaining the lock button 36 in the locked position. Accordingly, the collar 58 is locked in a shipping position by the extended lock button 36 for preventing the insertion of a control member or ball 28 into the first opening 32a of the bore 32 with the collar 58 being movable to an installed position for maintaining the lock button 36 in the locked position whereby the collar 58 prevent the installer from inadvertently inserting the control ball 28 into the wrong first opening 32a during installation and therafter insures that the lock button 36 is fully in the locked position when moved to the installed position.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. A motion-transmitting remote-control assembly (10) for transmitting motion along a curved path, said assembly comprising:

a flexible motion-transmitting core element (12), a conduit (14) slidably supporting said core element (12), terminal means (30) having a bore (32) extending therethrough defining oppositely facing first (32a) and second (32b) openings with said second opening (32b) disposed for connecting said core element (12) to a control member (28), adjustment means interconnecting said terminal means (30) and said core element (12) for adjusting the position of said terminal means (30) axially along said core element (12) and including a lock button (36) movable between an unlocked position extending from said assembly and a locked position within said assembly for locking the axial position of said terminal means (30) relative to said core element (12), and characterized by security means (58) locked in a shipping position by said lock button (36) for preventing the insertion of the control member (28) into said first opening (32a) and movable to an installed position for maintaining said lock button (36) in said locked position whereby said security means (58) prevents an installer from inadvertently inserting the control member (28) into the first opening (32a) during installation and to thereafter insure that the lock button (36) is fully in the locked position when moved to said installed position.

2. An assembly as set forth in claim 1 wherein said security means comprises an integral member (58) slidably movable along said terminal means (30) for blocking entry into said first opening (32a) in said shipping position and for covering said lock button (36) in said installed position.

3. An assembly as set forth in claim 2 wherein said integral member comprises a collar (58) extending around said terminal means (30).

4. An assembly as set forth in claim 3 including detent means (60, 62, 64) for releasably retaining said collar (58) in said respective shipping and installed positions.

5. An assembly as set forth in claim 4 wherein said detent means includes a cantilevered pawl (60) extending from said collar (58) and a pair of spaced recesses (62) in said terminal means (30) for receiving said pawl (60).

6. An assembly as set forth in claim 5 wherein said terminal means (30) has first (46) and second (48) opposite sides with a tunnel (50) extending between said sides, said lock button (36) disposed in said tunnel (50) for movement therein, said collar (58) covers said lock button (36) on said first side (46) of said terminal means (30) when in said installed position and said lock button (58) protrudes from said terminal means (30) on said second side (48) when in said installed position, said collar (58) including a cutout (68) for accommodating the extending portion of said lock button (58) when in said installed position.

7. An assembly as set forth in claim 6 wherein said collar (58) includes an axially extending flange (66) for said blocking of said first opening (32a).

8. An assembly as set forth in claim 7 wherein said cutout (68) and said pawl (60) are disposed on said second side (48) of said terminal means (30) and said flange (66) is on said first side (46) of said terminal means (30).

9. An assembly as set forth in claim 8 wherein said adjustment means includes a shaft member (38) disposed for axial sliding movement within said terminal means (30), said shaft member (38) and said lock button (36) including co-acting teeth (42, 44) for preventing relative movement between said shaft member (38) and said terminal means (30) when said lock button (36) is in said locked position.

\* \* \* \* \*